(No Model.)

T. W. JOHNSON.
FUNNEL.

No. 489,585. Patented Jan. 10, 1893.

WITNESSES
Geo. W. Washington
Leon M. Abbott

INVENTOR
Thomas Walnnn Johnson
By Johnson & Ramsey ATTY

UNITED STATES PATENT OFFICE.

THOMAS WALACE JOHNSON, OF BOSTON, MASSACHUSETTS.

FUNNEL.

SPECIFICATION forming part of Letters Patent No. 489,585, dated January 10, 1893.

Application filed May 4, 1892. Serial No. 431,798. (No model.)

*To all whom it may concern:*

Be it known that I, THOMAS WALACE JOHNSON, a citizen of the United States, residing at Boston, in the county of Suffolk and Commonwealth of Massachusetts, have invented a Funnel for Making Pousse Café and other Drinks, of which the following is a specification, reference being had to the accompanying drawings.

The invention is called "pousse café funnel;" and its object is for the use of bartenders and others as an aid in making rapidly and successfully "pousse café" and other drinks. It is a funnel shaped apparatus with as many compartments as are desired to contain the different liquors necessary for making the drink. This, as shown by the drawings, has four compartments. The funnel may be of any desired size or shape.

Figure 1:
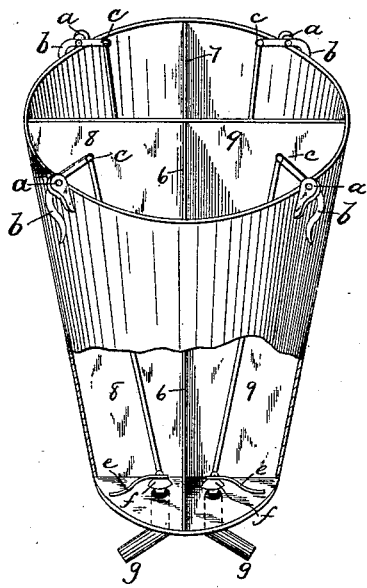

Figure 1, is the representation of the funnel with its different parts. 6, 7, 8 and 9 are the different compartments for the liquors; *b, b, b, b,* are rods in their compartments, jointed at *c, c, c, c,* and supported by *a, a, a, a,* as braces, these rods connecting also with *f, f, f, f,* stoppers attached to *b, b, b, b*. When *b, b, b, b,* are depressed the stoppers are raised, the force of which raises the springs, *e, e, e, e,* and the liquors are allowed to pass out through the tubes *g, g, g, g. g, g, g, g,* are tubes leading from the compartments, 6, 7, 8, 9, of the funnel. In order to operate the funnel the operator presses the rods *b, b, b, b,* which are connected to *f, f, f, f,* the stoppers. This draws the stoppers from the tubes and allows the liquors to pass through the tubes into the glass. When the rods are released the stoppers return to their proper places in the tubes by the aid of the springs *e, e, e, e*.

Figure 2:
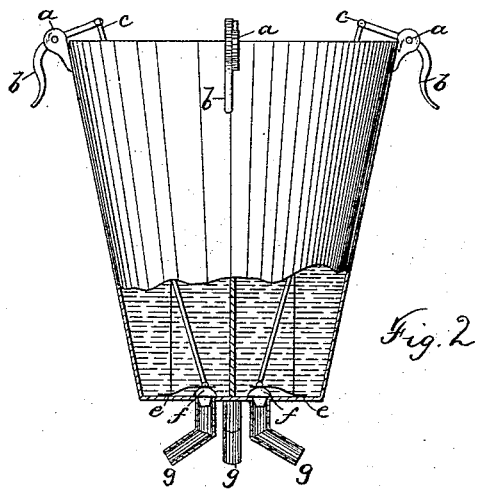
Figure 3:
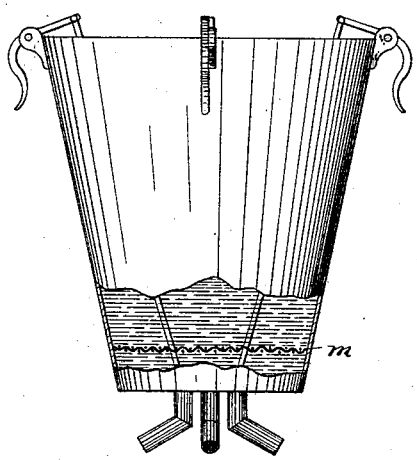
Figure 4:
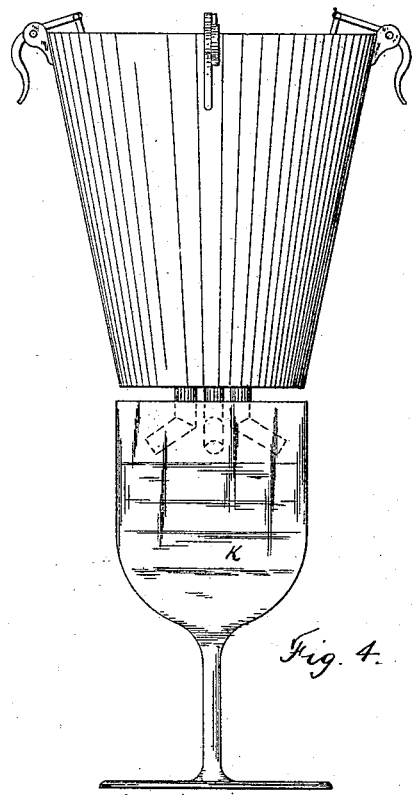

Fig. 1, shows the funnel without the strainer and with the stoppers *f, f, f, f,* up from the tubes. Fig. 2, shows the funnel without the strainer and the stoppers *f, f, f, f,* down into the tubes. Fig. 3, shows the funnel with strainer, *m*, and tubes projecting down into the glass. Fig. 4, shows the funnel as complete into the glass K, as when the drink is being made.

The funnel is made of copper, tin, or any other suitable material, with the stoppers made of rubber or any other substance necessary. The tubes *g, g, g, g,* are placed on the bottom opposite each other, near the edge of the funnel and extend only a short distance from the bottom and almost touch the sides of the glass.

What I claim as my invention is

The combination of a funnel, divided into compartments, having a strainer at the bottom, with tubes running from the bottom, with rods having stoppers attached thereto, said rods extending upward through the compartments, jointed at their upper ends and springs for operating the same; substantially as described.

THOMAS WALACE JOHNSON.

Witnesses:
 GEO. W. WASHINGTON,
 LEON M. ABBOTT.